United States Patent
Ikeda

(10) Patent No.: US 11,626,251 B2
(45) Date of Patent: Apr. 11, 2023

(54) MULTILAYER CERAMIC CAPACITOR

(71) Applicant: Murata Manufacturing Co., Ltd., Nagaokakyo (JP)

(72) Inventor: Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/232,357

(22) Filed: Apr. 16, 2021

(65) Prior Publication Data
US 2021/0335550 A1    Oct. 28, 2021

(30) Foreign Application Priority Data

Apr. 22, 2020   (JP) .............. JP2020-075811

(51) Int. Cl.
| | |
|---|---|
| H01G 4/30 | (2006.01) |
| H01G 4/012 | (2006.01) |
| H01G 2/02 | (2006.01) |
| H01G 4/008 | (2006.01) |
| H01G 4/12 | (2006.01) |

(52) U.S. Cl.
CPC .............. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ........... H01G 4/30; H01G 2/02; H01G 4/008; H01G 4/012; H01G 4/1218
USPC .............. 361/321.1, 301.4, 321.3, 303
See application file for complete search history.

(56) References Cited

U.S. PATENT DOCUMENTS

| | | | | |
|---|---|---|---|---|
| 2005/0264975 A1* | 12/2005 | Yamazaki | ............ | H01C 7/18 361/301.1 |
| 2012/0229949 A1* | 9/2012 | Kim | .............. | H01G 4/12 361/321.2 |
| 2012/0306325 A1* | 12/2012 | Kim | ............ | H01G 4/005 336/200 |

(Continued)

FOREIGN PATENT DOCUMENTS

| | | |
|---|---|---|
| CN | 110828169 A | 2/2020 |
| CN | 111048310 A | 4/2020 |
| JP | 2015-023209 A | 2/2015 |

OTHER PUBLICATIONS

First office action in CN202110427658.0, dated Jun. 24, 2022, 11 pages.

*Primary Examiner* — Arun Ramaswamy
(74) *Attorney, Agent, or Firm* — Keating & Bennett, LLP

(57) ABSTRACT

A multilayer ceramic capacitor includes a multilayer body, and two external electrodes. The multilayer body includes a multilayer body main portion including an inner layer portion including dielectric layers and internal electrode layers that are stacked, and two outer layer portions on opposite sides of the inner layer portion in a stacking direction, two side gap portions on opposite sides of the multilayer main body in a width direction, two main surfaces on opposite sides in the stacking direction, two side surfaces on opposite sides in the width direction, and two end surfaces on opposite sides in a length direction. Each of the two external electrodes are at an end surface of the multilayer body, and extend from the end surface to a portion of the main surface. An end of the side gap portion on a side of the main surface protrudes farther than the multilayer main body.

17 Claims, 9 Drawing Sheets

(56) References Cited

U.S. PATENT DOCUMENTS

| | | | |
|---|---|---|---|
| 2014/0311789 A1* | 10/2014 | Han | H01G 4/12 |
| | | | 361/301.4 |
| 2015/0021079 A1* | 1/2015 | Lee | H05K 1/185 |
| | | | 361/301.4 |
| 2015/0116896 A1* | 4/2015 | Inazu | H01G 4/30 |
| | | | 361/301.4 |
| 2015/0136462 A1* | 5/2015 | Lee | H01G 4/30 |
| | | | 361/301.4 |
| 2016/0211074 A1* | 7/2016 | Gu | H01G 4/012 |
| 2016/0351335 A1* | 12/2016 | Kato | H01G 4/232 |
| 2017/0076867 A1* | 3/2017 | Okai | H01G 4/30 |
| 2017/0287643 A1* | 10/2017 | Kobayashi | H01G 4/30 |
| 2020/0051739 A1 | 2/2020 | Park et al. | |
| 2020/0098519 A1* | 3/2020 | Kusumoto | H01G 4/1227 |
| 2020/0118747 A1* | 4/2020 | Muramatsu | H01G 4/008 |
| 2021/0005382 A1* | 1/2021 | Park | H01G 4/1227 |

* cited by examiner

MULTILAYER CERAMIC CAPACITOR

CROSS REFERENCE TO RELATED APPLICATIONS

This application claims the benefit of priority to Japanese Patent Application No. 2020-075811 filed on Apr. 22, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small-size multilayer ceramic capacitor has been demanded. Such a multilayer ceramic capacitor includes an inner layer portion in which dielectric layers made of a ferroelectric material having a relatively high dielectric constant and internal electrodes are alternately stacked. Furthermore, dielectric layers of outer layer portions are provided on the upper and lower portions of the inner layer portion alternately stacked, thus forming a rectangular multilayer body. Furthermore, side gap portions are provided on both side surfaces of the rectangular multilayer body in the width direction, and external electrodes are provided on both end surfaces thereof in the longitudinal direction.

However, since the dielectric layers have piezoelectric and electrostrictive properties, stress and mechanical strain occur when an electric field is applied. Such stress and mechanical strain cause vibration, which is then transmitted to a substrate on which the multilayer ceramic capacitor is mounted. In this situation, the entire substrate serves as an acoustic reflecting surface, and "acoustic noise", which is a vibration sound, is generated.

For this reason, a technique has been conventionally known in which an interposer is provided between a multilayer ceramic capacitor and a substrate on which the multilayer ceramic capacitor is mounted, and this interposer absorbs vibration to the substrate, thus suppressing the generation of "acoustic noise" (see, for example, to Japanese Unexamined Patent Application, Publication No. 2015-23209).

However, providing such an interposer increases the manufacturing cost, and processing for providing the interposer is also required.

SUMMARY OF THE INVENTION

Preferred embodiments of the present invention provide multilayer ceramic capacitors that are each capable of reducing or preventing the generation of "acoustic noise" at a low cost.

A multilayer ceramic capacitor according to a preferred embodiment of the present invention includes a multilayer body, and two external electrodes. The multilayer body includes a multilayer body main portion including an inner layer portion including a plurality of dielectric layers and a plurality of internal electrode layers alternately stacked, and two outer layer portions on opposite sides of the inner layer portion in a stacking direction, two side gap portions on opposite sides of the multilayer main body in a width direction intersecting the stacking direction, two main surfaces on opposite sides in the stacking direction, two side surfaces on opposite sides in the width direction, and two end surfaces on opposite sides in a length direction intersecting the stacking direction and the width direction, the two external electrodes each being provided at one of the two end surfaces of the multilayer body, and each extending from the one of the two end surfaces to a portion of the main surface, in which an end of the side gap portion on a side of the main surface protrudes farther than the multilayer main body.

According to preferred embodiments of the present invention, it is possible to provide multilayer ceramic capacitors that are each capable of reducing or preventing the generation of "acoustic noise" at a low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
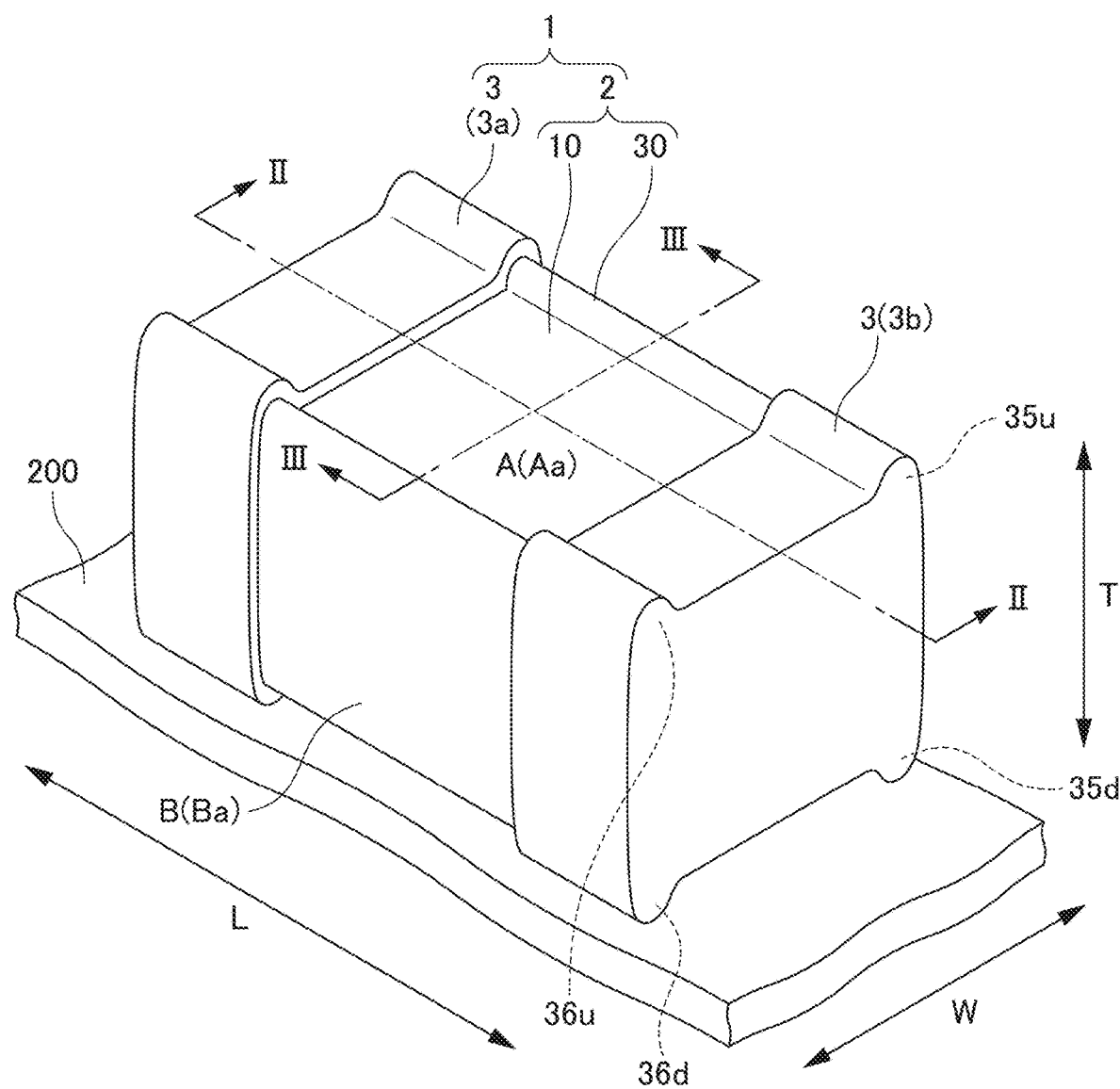
FIG. 1 is a schematic perspective view of a multilayer ceramic capacitor according to a preferred embodiment of the present invention.
Figure 2:
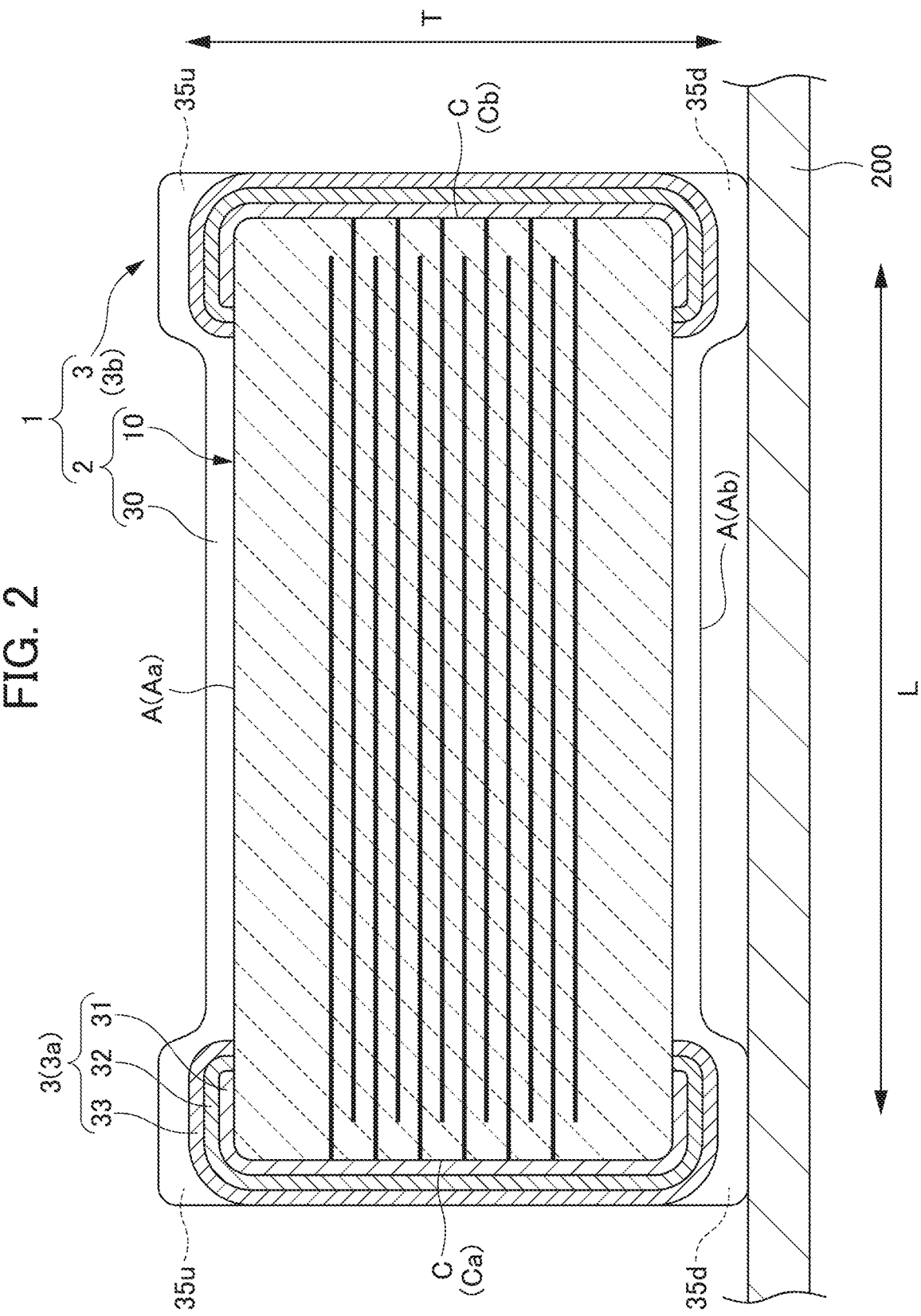
FIG. 2 is a cross-sectional view taken along the line II-II of the multilayer ceramic capacitor of FIG. 1.
Figure 3:
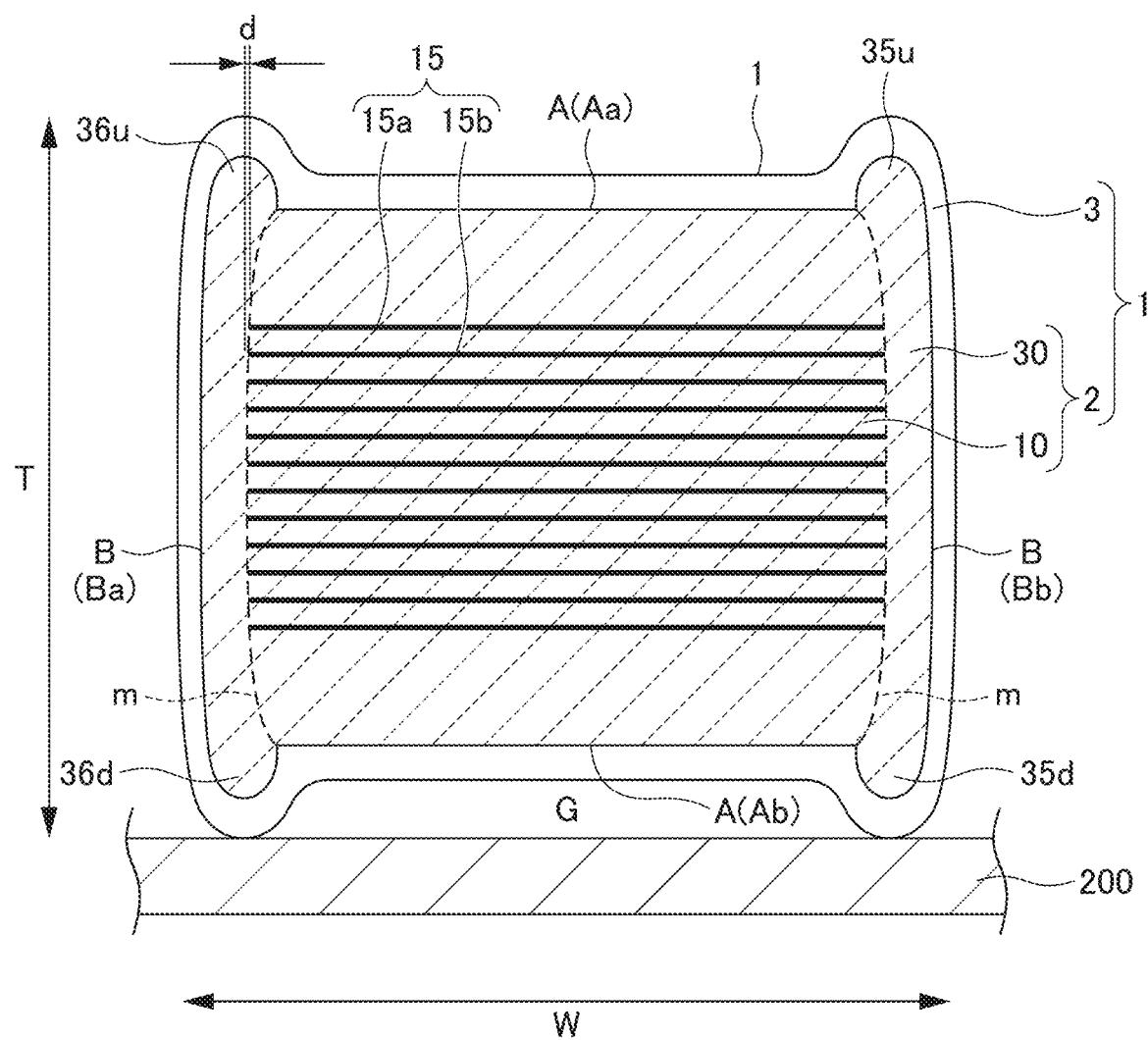
FIG. 3 is a cross-sectional view taken along the line III-III of the multilayer ceramic capacitor of FIG. 1.

Hereinafter, multilayer ceramic capacitors according to preferred embodiments of the present invention will be described. FIG. 1 is a schematic perspective view of a multilayer ceramic capacitor 1 according to a preferred embodiment of the present invention, showing a state mounted on a substrate 200. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 1.

The multilayer ceramic capacitor 1 has a rectangular or substantially rectangular shape, and includes a multilayer body 2 and a pair of external electrodes 3 provided at both ends of the multilayer body 2. The multilayer body 2 includes an inner layer portion 11 including a plurality of sets of a dielectric layer 14 and an internal electrode layer 15.

In the following description, as a term representing the orientation of the multilayer ceramic capacitor 1, the direction in which the pair of external electrodes 3 are provided in the multilayer ceramic capacitor 1 is defined as the length direction L. The direction in which the dielectric layers 14 and the internal electrode layers 15 are stacked (or laminated) is defined as the stacking direction T. The direction intersecting both of the length direction L and the stacking direction T is defined as the width direction W. It should be noted that, in the present preferred embodiment, the width direction is orthogonal or substantially orthogonal to both of the length direction L and the stacking direction T.

Figure 4:
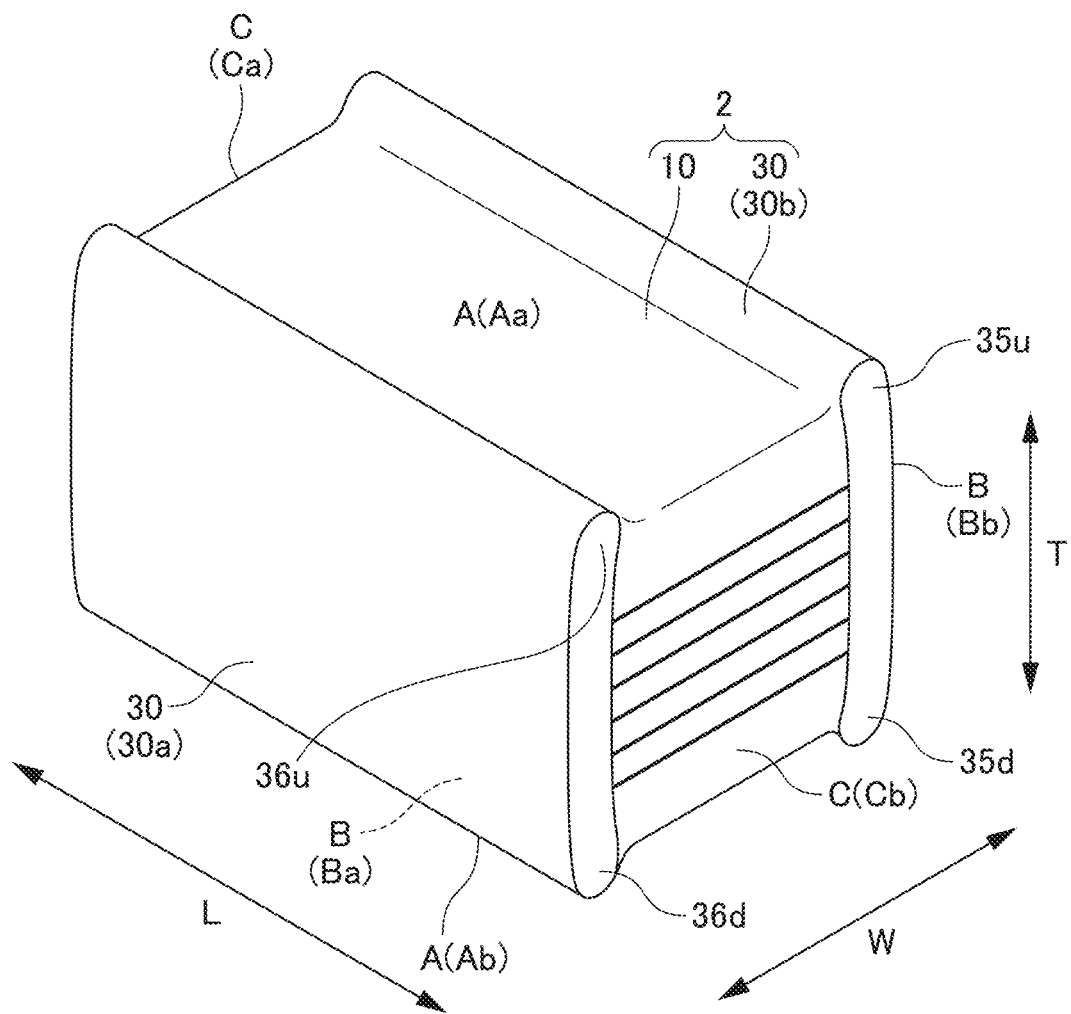
FIG. 4 is a schematic perspective view of a multilayer body according to a preferred embodiment of the present invention.
Figure 5:
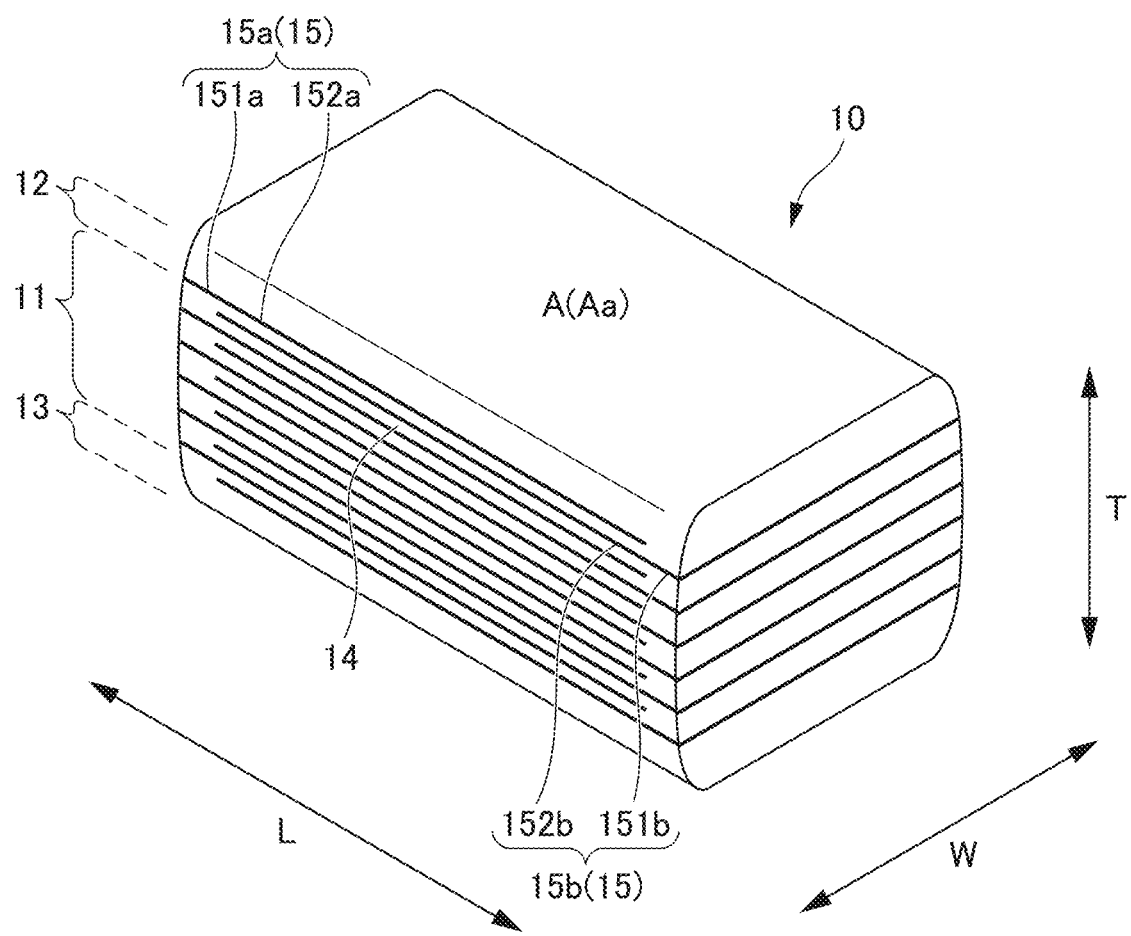
FIG. 5 is a schematic perspective view of a main body of the multilayer body of FIG. 4.

FIG. 4 is a schematic perspective view of the multilayer body 2. The multilayer body 2 includes a multilayer main body 10, and a side gap portion 30. FIG. 5 is a schematic perspective view of the multilayer main body 10.

In the following description, among the six outer surfaces of the multilayer body 2 shown in FIG. 4, a pair of outer surfaces on opposite sides in the stacking direction T are respectively defined as a first main surface Aa and a second main surface Ab, a pair of outer surfaces on opposite sides in the width direction W are respectively defined as a first side surface Ba and a second side surface Bb, and a pair of outer surfaces on opposite sides in the length direction L are respectively defined as a first end surface Ca and a second end surface Cb.

It should be noted that, in a case in which it is not necessary to specifically distinguish the first main surface Aa and the second main surface Ab from each other, they will be collectively described as the main surface A, in a case in which it is not necessary to specifically distinguish the first side surface Ba and the second side surface Bb from each other, they will be collectively described as the side surface B, and in a case in which it is not necessary to specifically distinguish the first end surface Ca and the second end surface Cb from each other, they will be collectively described as the end surface C.

Surface irregularities and the like, for example, may be provided on a portion or all of the main surface A, the side surface B, and the end surface C of the multilayer body 2. The dimension of the multilayer body 2 is not particularly limited. However, for example, it is preferable that the dimension in the length direction L is about 0.2 mm or more and about 10 mm or less, the dimension in the width direction W is about 0.1 mm or more and about 10 mm or less, and the dimension in the stacking direction T is about 0.1 mm or more and about 5 mm or less.

As shown in FIG. 5, the multilayer main body 10 includes the inner layer portion 11, an upper outer layer portion 12 disposed adjacent to the first main surface Aa of the inner layer portion 11, and a lower outer layer portion 13 disposed adjacent to the second main surface Ab.

The inner layer portion 11 includes the plurality of sets of the dielectric layer 14 and the internal electrode layer 15 which are alternately stacked along the stacking direction T.

The dielectric layer 14 preferably has, for example, a thickness of about 0.5 µm or less. The dielectric layer 14 is made of a ceramic material. As the ceramic material, for example, a dielectric ceramic including $BaTiO_3$ as a main component may be used. Furthermore, a ceramic material obtained by adding at least one of sub-components such as, for example, Mn compounds, Fe compounds, Cr compounds, Co compounds, and Ni compounds to these main components may be used. It should be noted that the number of dielectric layers 14 including the multilayer main body 10 including the upper outer layer portion 12 and the lower outer layer portion 13 is preferably fifteen sheets or more and 700 sheets or less, for example.

The internal electrode layer 15 includes a plurality of first internal electrode layers 15a and a plurality of second internal electrode layers 15b. The first internal electrode layers 15a and the second internal electrode layers 15b are alternately arranged to each other. It should be noted that, when it is not necessary to distinguish the first internal electrode layer 15a from the second internal electrode layer 15b, they will be collectively described as the internal electrode layer 15.

The first internal electrode layer 15a includes a first opposing portion 152a provided opposite to the second internal electrode layer 15b, and a first lead-out portion 151a extending from the first opposing portion 152a to the side of the first end surface Ca. An end of the first lead-out portion 151a is exposed on the first end surface Ca and is electrically connected to a first external electrode 3a to be described later.

The second internal electrode layer 15b includes a second opposing portion 152b provided opposite to the first internal electrode layer 15a, and a second lead-out portion 151b extending from the second opposing portion 152b to the second end surface Cb. An end of the second lead-out portion 151b is electrically connected to a second external electrode 3b to be described later.

Charge is accumulated in the first opposing portion 152a of the first internal electrode layer 15a and the second opposing portion 152b of the second internal electrode layer 15b, such that the characteristics of the capacitor are provided.

As shown in FIG. 3, in the WT cross-section which is a cross section of the width direction W and the stacking direction T passing through the center or approximate center of the multilayer body 2, the positional deviation d in the width direction W stacking between the ends in the width direction W of the first internal electrode layer 15a and the second internal electrode layer 15b which are vertically adjacent to each other in the stacking direction T is preferably about 0.5 µm or less, for example. That is, the ends in the width direction W of the first internal electrode layer 15a and the second internal electrode layer 15b vertically adjacent to each other in the stacking direction T are at the same or substantially at the same position on the width direction W, and the positions of the ends are aligned in the stacking direction T.

On the other hand, in the same or similar manner, in the WT cross-section which is a cross section of the width direction W and the stacking direction T passing through the center or approximate center of the multilayer body 2 shown in FIG. 3, a line m shown by a dotted line in FIG. 3 connecting all of the ends in the width direction W of the first internal electrode layers 15a and the second internal electrode layers 15b provided adjacent to each other in the stacking direction T is slightly convex toward the outside. In other words, the internal electrode layer 15 is pressed and extends at the center or approximate center portion in the stacking direction T of the first internal electrode layer 15a and the second internal electrode layer 15b. The upper end and the lower end in the stacking direction T are pressed and withdrawn. It should be noted that the convex shape can also be referred to as a drum shape.

That is, the ends in the width direction W of the first internal electrode layer 15a and the second internal electrode layer 15b are at the same or substantially at the same position in the width direction W when the adjacent two layers in the stacking direction T are viewed. However, when the ends along the entire length in the stacking direction T is viewed, they are in a slightly convex shape toward the outside. The reason for such convexity will be described later.

The internal electrode layer 15 is preferably made of a metallic material such as Ni, Cu, Ag, Pd, or Au, or Ag—Pd alloy, for example.

The thickness of the internal electrode layer 15 is preferably about 0.5 μm or more and about 2.0 μm or less, for example. The number of the internal electrode layers 15 is preferably, for example, fifteen or more and 200 or less in total of the first internal electrode layer 15a and the second internal electrode layer 15b.

The upper outer layer portion 12 and the lower outer layer portion 13 are preferably made of the same material as the dielectric layer 14 of the inner layer portion 11. The thickness of each of the upper outer layer portion 12 and the lower outer layer portion 13 is preferably, for example, about 20 μm or more and about 60 μm or less, and more preferably about 20 μm or more and about 40 μm or less.

The side gap portion 30 includes a first side gap portion 30a provided adjacent to the first side surface Ba of the multilayer main body 10 and a second side gap portion 30b provided adjacent to the second side surface Bb of the multilayer main body 10. It should be noted that, in a case in which it is not necessary to specifically distinguish the first side gap portion 30a and the second side gap portion 30b from each other, they will be collectively described as the side gap portion 30.

The particle size of the grains of the dielectric of the side gap portion 30 decreases from the inner layer toward the outside. The particle size of the grain is preferably, for example, about 400 nm or more and about 450 nm or less at the outermost side, and about 600 nm or more at the innermost side, and the particle size of the innermost grain is preferably, for example, about 1.5 times or more than the particle size of the outermost grain. It should be noted that, regarding the particle size of the grain, the side gap portion 30 is assumed to be divided into a plurality of regions each having a dimension of about 20 nm in the width direction from the side surface side at the center or approximate portion in the stacking direction T of the side gap portion 30, and for each region, the area of the particle size is measured, and the area is converted into a circle equivalent diameter to determine the average particle size in each region. The region of less than about 20 nm will have the average particle size within the region.

The side gap portion 30 covers a flat end surface on the side in the width direction W of the internal electrode layer 15 which is exposed on the both side surfaces B of the multilayer main body 10 along its flat end surface in a planar manner. The side gap portion 30 is preferably made of the same material as the dielectric layer 14, and further includes, for example, Mg as a sintering aid. Mg migrates to the side of the internal electrode layer 15 during sintering of the side gap portion 30, such that Mg is segregated on the side of the side gap portion 30 in contact with the internal electrode layer 15. Furthermore, an interface is provided between the multilayer main body 10 and the side gap portion 30.

Furthermore, the thickness of the side gap portion 30 is preferably, for example, about 20 μm, and more preferably about 10 μm or less. Furthermore, although the side gap portion 30 is a single layer in the present preferred embodiment, the present invention is not limited thereto, and the side gap portion 30 may have a two-layer structure including an outer side gap layer located on the outside and an inner side gap layer located on the side of the internal electrode layer 15.

Furthermore, the ends on both sides of the side gap portion 30 in the stacking direction T protrude farther than the multilayer main body 10. The protrusion amount is preferably about 10 μm or more, and about 15 μm or less, for example.

In other words, a first protruding portion 35u on the side of the first main surface Aa of the first side gap portion 30a protrudes outward farther than the first main surface Aa, and a second protruding portion 35d on the side of the second main surface Ab of the first side gap portion 30a protrudes outward farther than the second main surface Ab.

Furthermore, a first protruding portion 36u on the side of the first main surface Aa of the second side gap portion 30b protrudes outward farther than the first main surface Aa, and a second protruding portion 36d on the side of the second main surface Ab of the second side gap portion 30b protrudes outward farther than the second main surface Ab.

It should be noted that, in a case in which it is not necessary to specifically distinguish the first protruding portion 35u, the second protruding portion 35d, the first protruding portion 36u, and the second protruding portion 36d from each other, they will be collectively described as the protruding portion 35.

Furthermore, a configuration is described in which the protruding portion 35 is provided at the ends on the both sides of the side gap portion 30 in the stacking direction in the present preferred embodiment. However, the present invention is not limited thereto. It will suffice if at least the second protruding portion 35d of the side gap portion 30 as the end on the side of the second main surface Ab to be provided on the substrate 200 in the stacking direction T is provided.

It should be noted that, as described above, regarding the internal electrode layer 15, a line connecting the ends of the internal electrode layers 15 on the side of the side surface B in the WT cross section has a convex shape toward the outside. Therefore, the side gap portion 30 provided on the outside also has a convex shape toward the outside in the WT cross section.

The external electrode 3 includes a first external electrode 3a provided on the first end surface Ca of the multilayer body 2, and a second external electrode 3b provided on the second end surface Cb of the multilayer body 2. It should be noted that, in a case in which it is not necessary to specifically distinguish between the first external electrode 3a and the second external electrode 3b, they will be collectively described as an external electrode 3. The external electrode 3 covers not only the end surface C, but also a portion of each of the main surface A and the side surface B close to the end surface C.

As described above, the end of the first lead-out portion 151a of the first internal electrode layer 15a is exposed at the first end surface Ca and electrically connected to the first external electrode 3a. Furthermore, the end of the second lead-out portion 151b of the second internal electrode layer 15b is exposed to the second end surface Cb, and is electrically connected to the second external electrode 3b. This provides a structure in which a plurality of capacitor elements are electrically connected in parallel between the first external electrode 3a and the second external electrode 3b.

Furthermore, the external electrode 3 includes a three-layer structure including a foundation electrode layer 31, a conductive resin layer 32 provided on the foundation electrode layer 31, and a plated layer 33 provided on the conductive resin layer 32.

The foundation electrode layer 31 is provided, for example, by applying and firing a conductive paste including a conductive metal and glass. As the conductive metal of the foundation electrode layer 31, for example, Cu, Ni, Ag, Pd, Ag—Pd alloy, Au or the like can be used.

The conductive resin layer 32 covers the foundation electrode layer 31. The conductive resin layer 32 has any configuration including a thermosetting resin and a metal component. As specific examples of the thermosetting resin, various known thermosetting resins such as, for example, epoxy resin, phenolic resin, urethane resin, silicone resin, polyimide resin, and the like can be used. As the metal component, for example, Ag or a metal powder coated with Ag on the surface of the base metal powder can be used.

The plated layer 33 preferably includes plating of one metal or an alloy including the metal selected from the group consisting of, for example, Cu, Ni, Su, Ag, Pd, Ag—Pd alloy, Au, or the like.

Thus, since the conductive resin layer 32 includes a thermosetting resin, for example, the conductive resin layer 32 is more flexible than the foundation electrode layer 31 made of a plated film or a fired product of a conductive paste. Therefore, even when an impact caused by physical shock or thermal cycling to the multilayer ceramic capacitor 1 is applied, the conductive resin layer 32 defines and functions as a buffer layer, whereby the generation of cracks in the multilayer ceramic capacitor 1 is prevented, piezoelectric vibration is easily absorbed, and an effect of reducing or preventing the "acoustic noise" is achieved.

Figure 6:
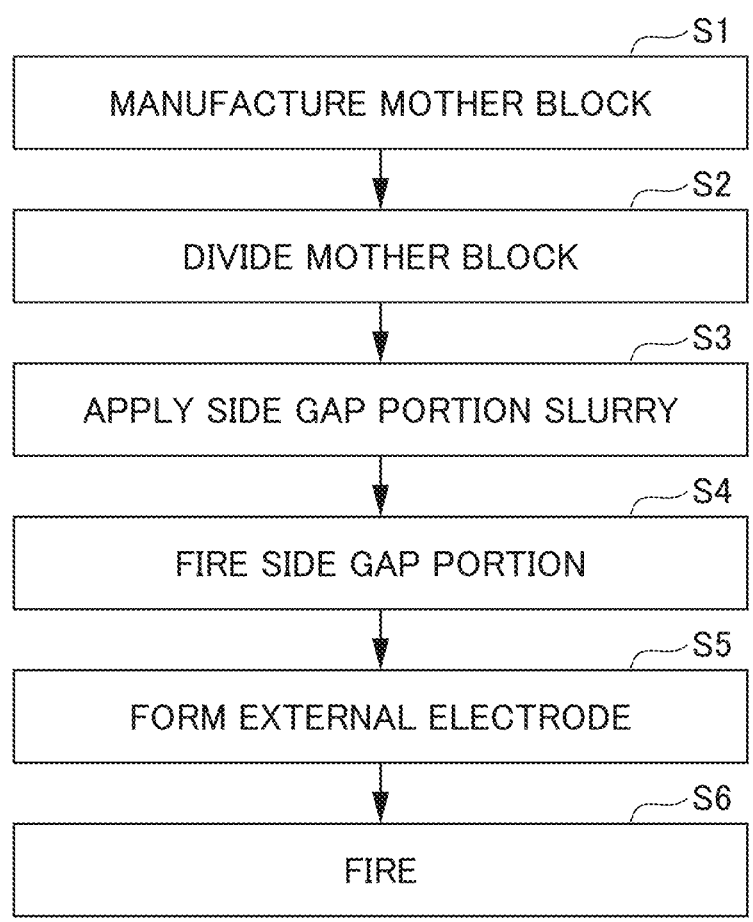
FIG. 6 is a flowchart for explaining a non-limiting example of a method of manufacturing a multilayer ceramic capacitor according to a preferred embodiment of the present invention.
Figure 7:
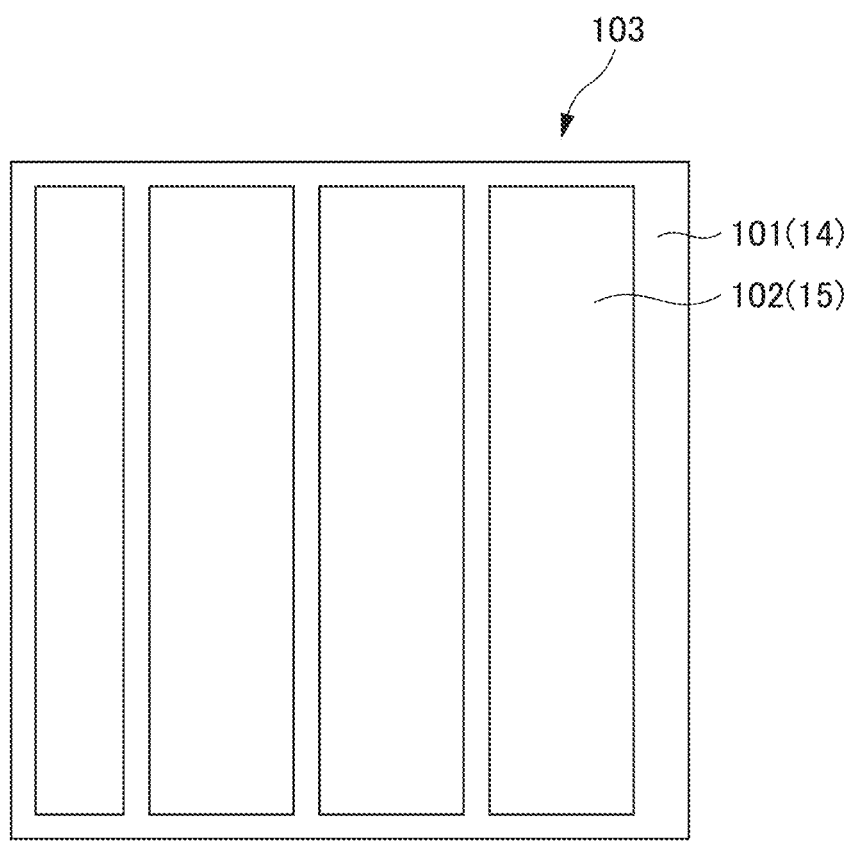
FIG. 7 is a schematic plan view of material sheets.
Figure 8:
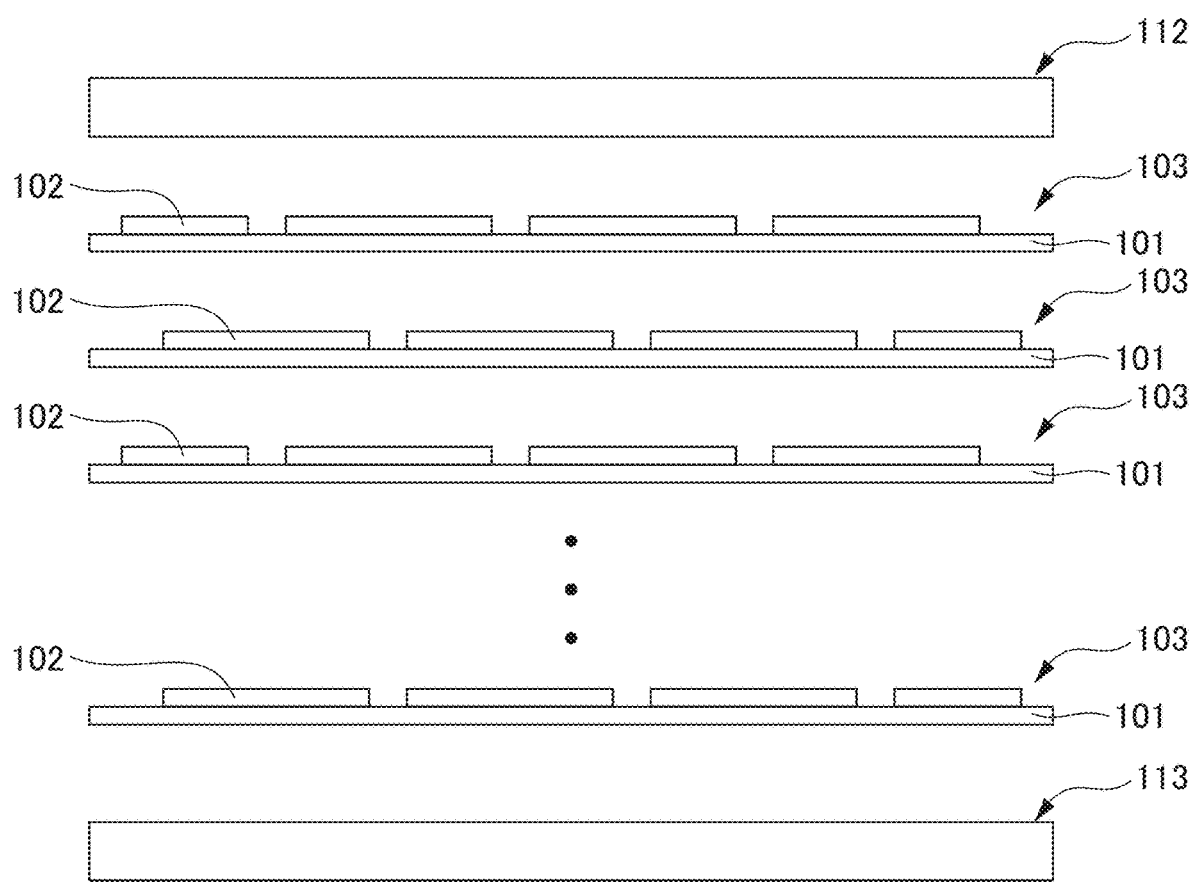
FIG. 8 is a schematic view showing a stacked state of the material sheets.
Figure 9:
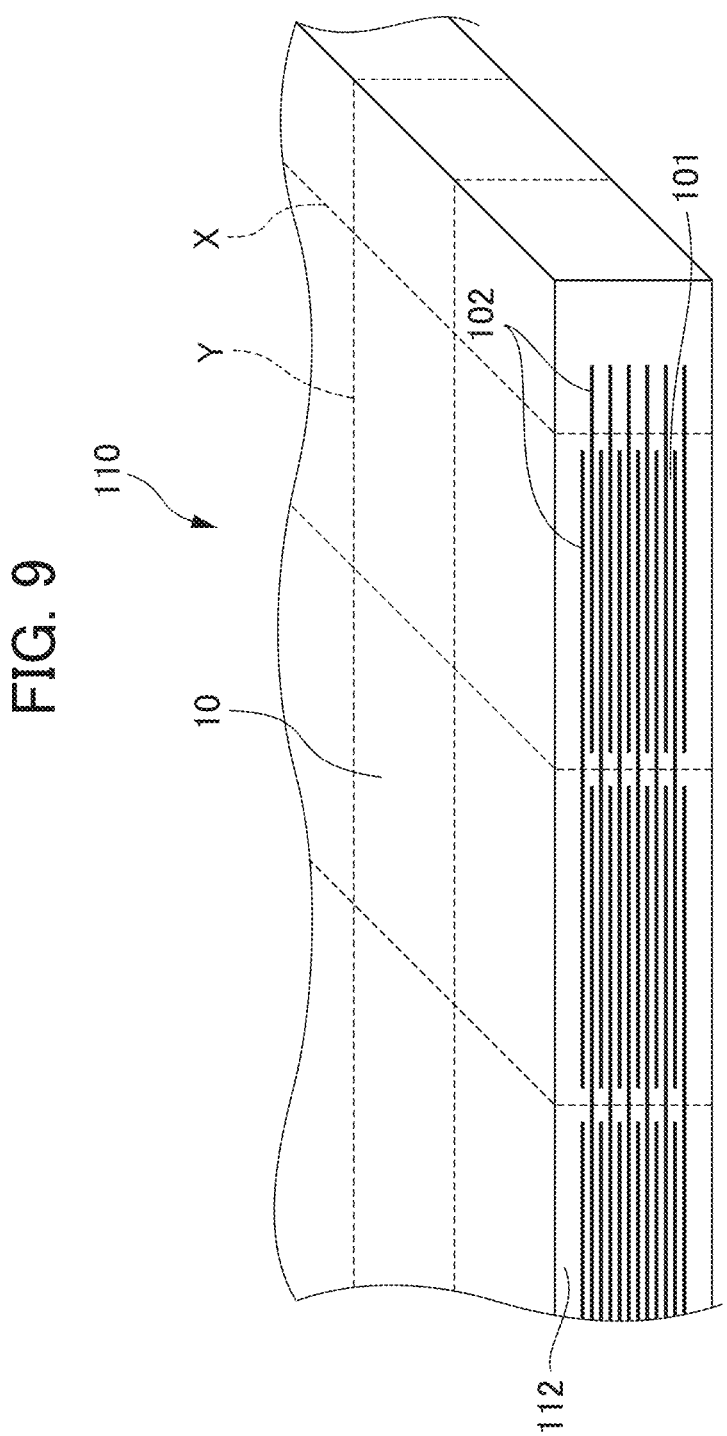
FIG. 9 is a schematic perspective view of a mother block.

FIG. 6 is a flowchart for explaining a non-limiting example of a manufacturing method of the multilayer ceramic capacitor 1 according to a preferred embodiment of the present invention. FIG. 7 is a schematic plan view of material sheets 103. FIG. 8 is a schematic view showing a stacked state of the material sheets 103. FIG. 9 is a schematic perspective view of a mother block 110.

Mother Block Manufacturing Step S1

FIG. 7 is a schematic plan view of the material sheet 103. FIG. 8 is a schematic view showing a stacked state of the material sheet 103. Furthermore, FIG. 9 is a schematic side view of the mother block 110.

First, a ceramic slurry including a ceramic powder, a binder and a solvent is prepared. The ceramic slurry is formed in a sheet shape on a carrier film by using a die coater, gravure coater, micro gravure coater, or the like, for example, thus manufacturing a multilayer ceramic green sheet 101.

Subsequently, the conductive paste is printed onto the multilayer ceramic green sheet 101 by screen printing, ink jet printing, gravure printing or the like, for example, so as to have a strip-shaped pattern, thus forming a conductive pattern 102.

Thus, as shown in FIG. 7, the material sheet 103 is provided in which the conductive pattern 102 defining and functioning as the internal electrode layer 15 is printed on the surface of the multilayer ceramic green sheet 101 defining and functioning as the dielectric layer 14.

Subsequently, as shown in FIG. 8, a plurality of material sheets 103 are stacked. More specifically, the plurality of material sheets 103 are stacked such that the strip-shaped conductive patterns 102 are directed in the same direction, and the strip-shaped conductive patterns 102 are shifted by half a pitch in the width direction between the adjacent material sheets 103. Furthermore, an upper outer layer portion ceramic green sheet 112 defining and functioning as the upper outer layer portion 12 is stacked on one side of the plurality of stacked material sheet 103, while a lower outer layer portion ceramic green sheet 113 defining and functioning as the lower outer layer portion 13 is stacked on the other side thereof.

Subsequently, the upper outer layer portion ceramic green sheet 112, the plurality of stacked material sheets 103, and the lower outer layer portion ceramic green sheet 113 are subjected to thermocompression bonding. As a result, the mother block 110 shown in FIG. 9 is formed.

Mother Block Dividing Step S2

Next, as shown in FIG. 9, the mother block 110 is divided along a cutting line X and a cutting line Y intersecting the cutting line X corresponding to the dimension of the multilayer main body 10. As a result, a plurality of multilayer main body 10 shown in FIG. 5 are manufactured. It should be noted that, in the present preferred embodiment, the cutting line Y is orthogonal or substantially orthogonal to the cutting line X.

Here, the multilayer main body 10 that has been cut is pressed in the stacking direction in order to prevent peeling of the stacked dielectric layer 14 in the stacking direction. Then, the internal electrode layer 15, i.e., the center or approximate center portion of the first internal electrode layer 15a and the second internal electrode layer 15b in the stacking direction T, is pressed to extend. Therefore, as shown in FIG. 5, in the WT cross-section, the line m shown by a dotted line in the drawings connecting all of the ends in the width direction W of the first internal electrode layers 15a and the second internal electrode layers 15b provided adjacent to each other in the stacking direction T is slightly convex toward the outside.

Side Gap Portion Slurry Adhering Step S3

Next, a ceramic slurry in which Mg is added as a sintering aid to the same dielectric powder as that of the multilayer ceramic green sheet 101 is produced.

A side portion at which the internal electrode layer 15 of the multilayer main body 10 is exposed in the interior of the ceramic slurry is immersed therein. Then, since the ceramic slurry has relatively high viscosity, the slurry adheres to the side portion of the multilayer main body 10 and also extends around the first main surface Aa and the second main surface Ab, and adheres to a portion of each of the first main surface Aa and the second main surface Ab. As a result of this, the ceramic slurry adheres in a greater size than the size of the side portion, and the ends on both sides in the stacking direction T protrude farther than the multilayer main body 10.

Side Gap Portion Firing Step S4

Then, the multilayer main body 10 on which the layer which becomes the side gap portion 30 is provided is subjected to degreasing treatment in a nitrogen atmosphere under a predetermined condition, then fired at a predetermined temperature in a nitrogen-hydrogen-steam mixed atmosphere, and sintered to become the multilayer body 2.

Here, Mg of the side gap portion 30 migrates to the side of the internal electrode layer 15 during sintering. Thus, after sintering, Mg in the side gap portion 30 is segregated on the side of the inner electrode layer. Furthermore, the dielectric layer 14 and the side gap portion 30 are made of the same or substantially the same material. However, since the side gap portion 30 is affixed to the multilayer main body 10 including the dielectric layer 14, the interface is provided between the side gap portion 30 and the multilayer main body 10 even after sintering.

External Electrode Forming Step S5

Next, at both ends of the multilayer body 2, the foundation electrode layer 31, the conductive resin layer 32, and the plated layer 33 are sequentially formed to provide the external electrode 3.

Firing Step S6

Then, at a set firing temperature, heating for a predetermined time in a nitrogen atmosphere is performed. Thus, the external electrode 3 is fired on the multilayer body 2 to manufacture the multilayer ceramic capacitor 1.

As shown in FIGS. 1 to 3, when the multilayer ceramic capacitor 1 including the above configuration is mounted to the substrate 200, the second protruding portion 35d of the first side gap portion 30a as the end on the side of the second main surface Ab in the stacking direction T and the second protruding portion 36d of the second side gap portion 30b as the end on the side of the second main surface Ab in the stacking direction T are in contact with the substrate 200.

When electric power is supplied to the internal electrode layer 15 and an electric field is applied to the dielectric layer 14, there is a possibility that stress and mechanical strain are generated in the dielectric layer 14, which causes vibration. However, in the multilayer main body 10 in the present preferred embodiment, the second protruding portion 35d and the second protruding portion 36d are in contact with the substrate, and as shown in FIG. 3, the gap G is provided between the multilayer main body 10 and the substrate 200 in the region between the second protruding portion 35d and the second protruding portion 36d. Therefore, the vibration is hardly transmitted to the substrate 200 where the multilayer ceramic capacitor 1 is mounted, and thus, the occurrence of "acoustic noise" is reduced or prevented.

Furthermore, in a case in which the protruding amounts of the second protruding portion 35d and the second protruding portion 36d are smaller by about 5% than the dimension of the multilayer body 2 in the stacking direction T, the reducing or preventing effect of "acoustic noise" may be low, and in a case in which the protruding amounts are greater by about 20% than the dimension of the multilayer body 2 in the stacking direction T, this may cause chipping of the second protruding portion 35d and the second protruding portion 36d. For this reason, the protruding amount of the second protruding portion 35d and the second protruding portion 36d in preferred embodiments of the present invention is preferably, for example, about 5% or more and about 20% or less of the dimension of the multilayer body 2 in the stacking direction T. It should be noted that, for example, in a case of being about 10% or more of the dimension of the multilayer body 2 in the stacking direction T, the effect of reducing "acoustic noise" is improved.

Furthermore, the conductive resin layer 32 includes a flexible thermosetting resin. Therefore, even when an impact caused by physical shock or thermal cycling acts on the multilayer ceramic capacitor 1, the conductive resin layer 32 defines and functions as a buffer layer, and it is possible to prevent cracks in the multilayer ceramic capacitor 1, easily absorb piezoelectric vibration, and further reduce or prevent an "acoustic noise".

Although preferred embodiments of the present invention have been described above, the present invention is not limited to the preferred embodiments, and various modifications can be made within the scope of the gist thereof.

For example, in the above-described preferred embodiments, since the ends on both sides in the stacking direction T provide the side gap portions 30 protruding farther than the multilayer main body 10, they are immersed in the slurry. However, the present invention is not limited thereto, and the side gap portion 30 may be provided in which the ends on both sides in the stacking direction T protrude farther than the multilayer main body 10 by affixing a side gap green sheet which is larger than the side portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body; and
two external electrodes; wherein
the multilayer body including:
 a multilayer body main portion including an inner layer portion including a plurality of dielectric layers and a plurality of internal electrode layers that are alternately stacked, and two outer layer portions on opposite sides of the inner layer portion in a stacking direction;
 two side gap portions on opposite sides of the multilayer main body in a width direction intersecting the stacking direction;
 two main surfaces on opposite sides in the stacking direction;
 two side surfaces on opposite sides in the width direction; and
 two end surfaces on opposite sides in a length direction intersecting the stacking direction and the width direction;
the two external electrodes each being provided at one of the two end surfaces of the multilayer body, and each extending from one of the two end surfaces to a portion of the main surface;
an end of the side gap portion on a side of the main surface protrudes farther than the multilayer main body;
a positional deviation in the width direction between ends in the width direction of any two adjacent internal electrode layers among the plurality of internal electrode layers which are vertically adjacent to each other in the stacking direction is about 0.5 µm or less; and
in a cross section of the width direction and the stacking direction passing through a center or an approximate center of the multilayer body, a line at the side surface connecting the ends of any two adjacent internal electrode layers among the plurality of internal electrode layers in the stacking direction is convex toward outside.

2. The multilayer ceramic capacitor according to claim 1, wherein a thickness at a portion of the side gap portion in contact with the multilayer main body is about 10 µm or less.

3. The multilayer ceramic capacitor according to claim 1, wherein a protruding amount of an end of the side gap portion on a side of the main surface is about 5% or more and about 20% or less of a dimension of the multilayer main body in the stacking direction.

4. The multilayer ceramic capacitor according to claim 1, wherein magnesium is segregated at a portion of the side gap portion in contact with the internal electrode layer.

5. The multilayer ceramic capacitor according to claim 1, wherein the side gap portion includes:
an inner side gap layer in contact with the multilayer main body, and
an outer side gap layer in contact with the inner side gap layer.

6. The multilayer ceramic capacitor according to claim 1, wherein the external electrode includes:
a foundation electrode layer including a conductive metal and a glass component, and in contact with the multilayer body, and a conductive resin layer including a thermosetting resin and a metal component, and in contact with the foundation electrode layer.

7. The multilayer ceramic capacitor according to claim 1, wherein the multilayer body has a dimension in the length direction of about 0.2 mm or more and about 10 mm or less, a dimension in the width direction of about 0.1 mm or more and about 10 mm or less, and a dimension in the stacking direction of about 0.1 mm or more and about 5 mm or less.

8. The multilayer ceramic capacitor according to claim 1, wherein each of the plurality of dielectric layers has a thickness of about 0.5 µm or less.

9. The multilayer ceramic capacitor according to claim 1, wherein each of the plurality of dielectric layers includes $BaTiO_3$ as a main component.

10. The multilayer ceramic capacitor according to claim 9, wherein each of the plurality of dielectric layers includes at least one of Mn compounds, Fe compounds, Cr compounds, Co compounds, and Ni compounds as a subcomponent.

11. The multilayer ceramic capacitor according to claim 1, wherein each of the plurality of internal electrode layers includes at least one of Ni, Cu, Ag, Pd, Au, or Ag—Pd alloy.

12. The multilayer ceramic capacitor according to claim 1, wherein each of the plurality of internal electrode layers has a thickness of about 0.5 µm or more and about 2.0 µm or less.

13. The multilayer ceramic capacitor according to claim 1, wherein
each of the two side gap portions includes a dielectric material including grains; and
a particle size of the grains of the dielectric material decreases from an inner portion towards an outer portion of the two side gap portions.

14. The multilayer ceramic capacitor according to claim 13, wherein the particle size of the grains is about 400 nm or more and about 450 nm or less at an outermost side of the outer portion, and about 600 nm or more at an innermost side of the inner portion.

15. The multilayer ceramic capacitor according to claim 13, wherein the particle size of the grains at an innermost side of the inner portion is about 1.5 times or more than the particle size of the grains at the outermost side of the outer portion.

16. The multilayer ceramic capacitor according to claim 1, wherein a thickness of each of the two outer layer portions is about 20 µm or more and about 60 µm or less.

17. The multilayer ceramic capacitor according to claim 1, wherein a thickness of each of the two outer layer portions is about 20 µm or more and about 40 µm or less.

* * * * *